(12) United States Patent
Stevenson et al.

(10) Patent No.: US 6,572,007 B1
(45) Date of Patent: Jun. 3, 2003

(54) METHOD FOR ATTACHING METAL MEMBERS

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/054,779

(22) Filed: Jan. 23, 2002

(51) Int. Cl.[7] .......................... B23K 20/12; B23K 31/02
(52) U.S. Cl. ...................... 228/112.1; 228/2.1
(58) Field of Search ................ 228/112.1, 2.1

(56) References Cited

U.S. PATENT DOCUMENTS

| | | |
|---|---|---|
| 4,850,772 A | 7/1989 | Jenkins |
| 5,469,617 A | 11/1995 | Thomas et al. |
| 5,971,252 A | 10/1999 | Rosen et al. |
| 5,975,406 A | 11/1999 | Mahoney et al. |
| 6,053,391 A | 4/2000 | Heideman et al. |
| 6,138,895 A | 10/2000 | Oelgoetz et al. |
| 6,206,268 B1 | 3/2001 | Mahoney |
| 6,213,379 B1 | 4/2001 | Takeshita et al. |
| 6,227,430 B1 | 5/2001 | Rosen et al. |
| 6,264,088 B1 | 7/2001 | Larsson |
| 6,457,629 B1 * | 10/2002 | White |

FOREIGN PATENT DOCUMENTS

| | | | |
|---|---|---|---|
| JP | 02001205457 A | * | 7/2001 |
| JP | 2002001550 A | * | 1/2002 |
| JP | 02002153976 A | * | 5/2002 |

OTHER PUBLICATIONS

Copending U.S. patent application Ser. No. 10/055,575, entitled "A Method for Attaching Metal Members", Filed Contemporaneously Herewith.

Copending U.S. patent application Ser. No. 10/055,566, entitled "A Method for Attaching Metal Members", Filed Contemporaneously Herewith.

* cited by examiner

*Primary Examiner*—Tom Dunn
*Assistant Examiner*—Kiley Stoner
(74) *Attorney, Agent, or Firm*—Kathryn A. Marra

(57) ABSTRACT

The method includes the steps of providing a first metal member and contacting the first metal member with a second metal member. A substantially cylindrical rotatable member is provided and is rotated while frictionally engaging it with the first metal member for locally heating and melting a portion of the first metal member, and penetrating the rotatable member through the first metal member. The rotatable member is rotated while frictionally engaging it with the second metal member for locally heating and melting a portion of the second metal member. A wire is fed through the axially extending passage and melted as it exits the axially extending passage. The resulting molten wire is mixed with the resulting molten metal of the first and second member, and solidified to form a joint.

15 Claims, 2 Drawing Sheets

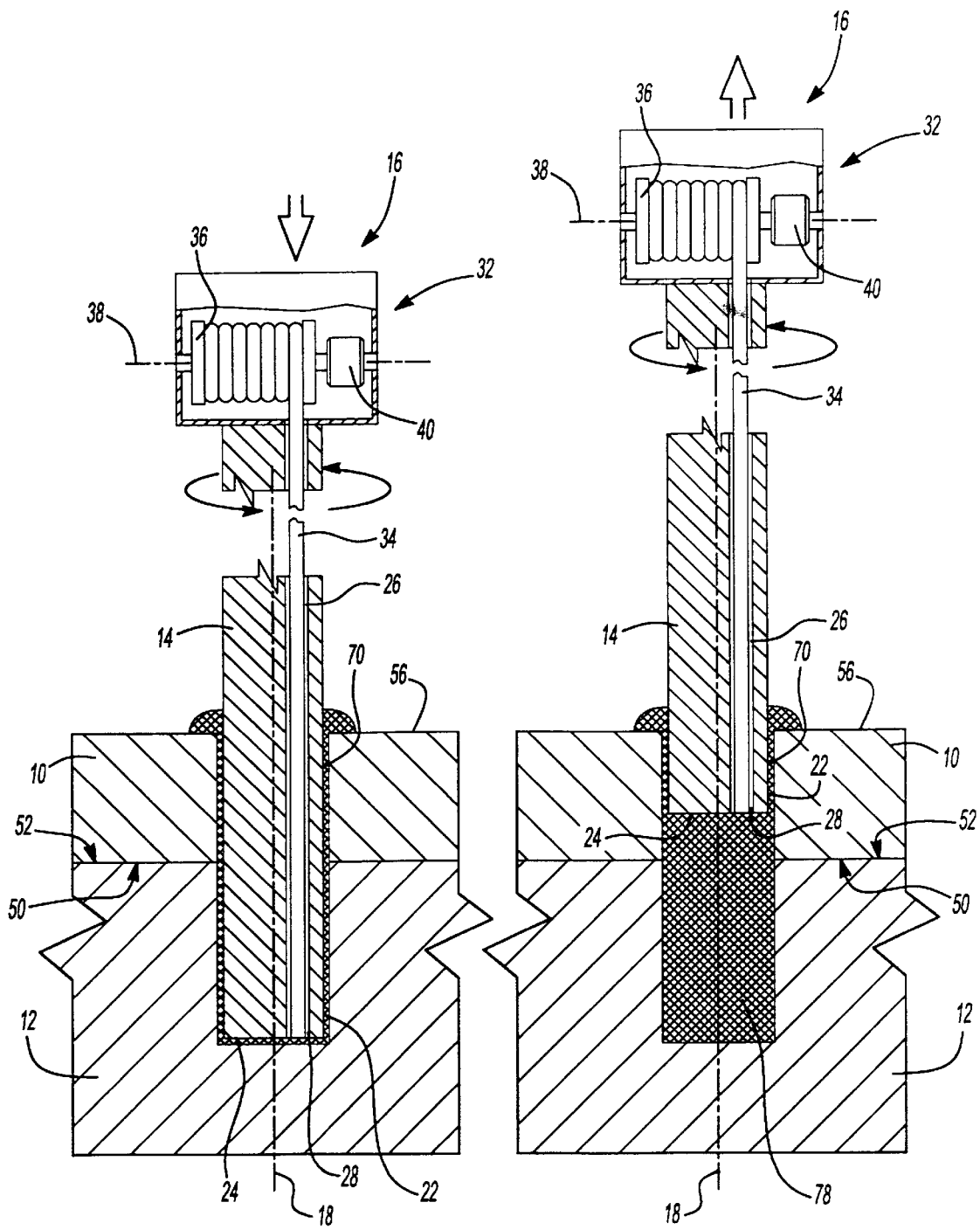
*Fig-1B*  *Fig-1C*

METHOD FOR ATTACHING METAL MEMBERS

TECHNICAL FIELD

The present invention relates to a method and apparatus for attaching metal members for assembling automotive vehicle structures.

BACKGROUND OF THE INVENTION

It is known that the manufacture of automotive vehicles often requires that metal members be attached to each other for forming automotive vehicle structures. Friction stir welding is one potential method of attaching metal members. Conventional friction stir welding typically requires a rotating tool to be translated along an interface between surfaces of metal members for softening or melting portions of the members at the interface. In turn, the softened or melted portions intermix and harden to form metallurgical bonds between the members. During a conventional friction stir welding process, however, substantial amounts of liquidized material may be lost or unused forming weaker bonds. Moreover, a conventional stir welding process may require relatively large amounts of time for forming metallurgical bonds. Thus, there is a need for improved techniques, fasteners or both, alternative to conventional friction stir welding for achieving high integrity attachment of a metal members.

SUMMARY OF THE INVENTION

The present invention meets these needs by providing an improved method for attaching metal members, with particular utility in the formation of components for an automotive vehicle. The method includes the steps of providing a first metal member and contacting the first metal member with a second metal member. A substantially cylindrical rotatable member is provided with a central axis and an axially extending passage, wherein the member is formed of a material with a melting point and hardness higher than that of the first and second metal members. The rotatable member is rotated while frictionally engaging it with the first metal member for locally heating and melting a portion of the first metal member, and penetrating the rotatable member through the first metal member. The rotatable member is also rotated while frictionally engaging it with the second metal member for locally heating and melting a portion of the second metal member. A wire is fed through the axially extending passage and melted as it exits the axially extending passage. The resulting molten wire is mixed with the resulting molten metal of the first and second member, and solidified to form a joint.

BRIEF DESCRIPTION OF THE DRAWINGS

These and other aspects and advantages of the present invention will become apparent upon reading the following detailed description in combination with the accompanying drawings, in which:

FIGS. 1(*b*) and 1(*c*) are sectional views of the system of FIG. 1(*a*) showing different steps of a preferred method of the system.

DETAILED DESCRIPTION OF THE PREFERRED EMBODIMENT

Figure 1A:
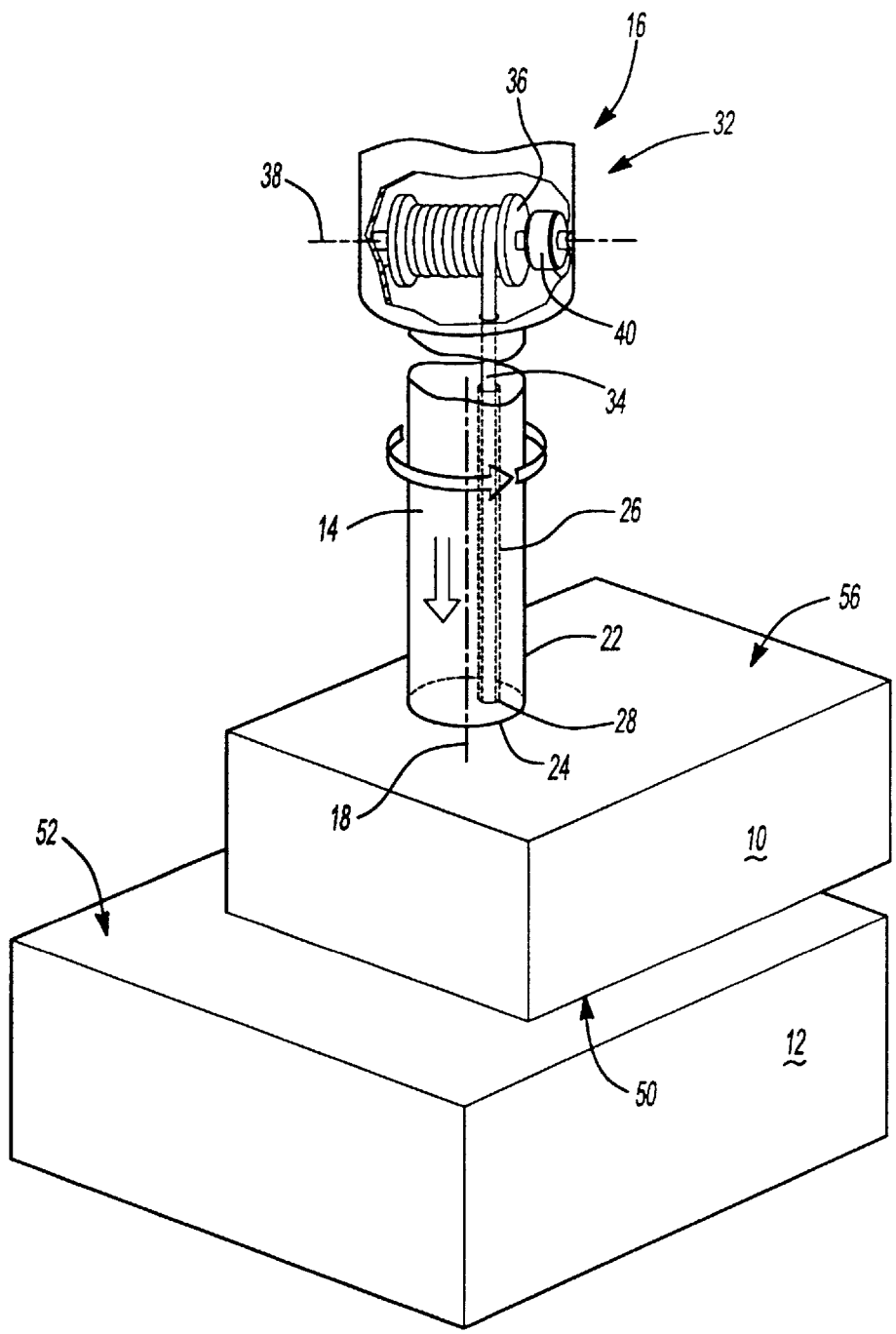
FIG. 1 (*a*) is a perspective view depicting a system in accordance with the present invention.

Referring to FIGS. 1(*a*)–1(*c*), there is illustrated one preferred system for attaching metal members to each other in accordance with the present invention. As shown, a metal sheet 10 is attached to a metal substrate 12 using a rotatable member 14 that is driven through the sheet 10 and into the substrate 12 by an apparatus 16 adapted for rotatably driving the member 14.

The rotatable member 14 is substantially cylindrical and substantially symmetrical about a central axis 18. The rotatable member 14 includes a generally cylindrical leading portion 22 with a circular leading surface 24. The rotatable member 14 includes an axially extending passage 26 extending along at least a portion of the length of the rotatable member 14 and having an opening 28 at the circular surface 24. The axis of the passage 26 is generally parallel to the central axis 18 and may be radially offset from the axis 18 as is shown.

Preferably, the rotatable member 14 is a metal, such as a refractory metal (e.g., a high carbon steel, titanium or the like), having a melting point that is substantially higher (e.g., at least 100° Fahrenheit and more preferably at least 200° Fahrenheit higher) than the materials of both the sheet 10 and the substrate 12. Moreover, the member 14 is preferably formed of a metal of higher hardness than each of the sheet 10 and substrate 12. The member 14 is also preferably formed of a material of relatively low solubility relative to the materials of the sheet 10 and substrate 12, so that alloying can be minimized or avoided altogether. It will be appreciated that the sheet, substrate or both will likely be a steel (e.g., low-carbon steel), magnesium, aluminum or the like.

The apparatus 16 includes a wire supply 32 for feeding wire 34 through the through-hole 26 of the cylindrical member 14. For example, the wire supply 32 may include a spool 36 having coiled wire thereon, and which can be rotated about an axis 38, such as with a motor 40 for un-winding the wire 34 from the spool. As shown, the axis 18 of the cylindrical member 14 is perpendicular to the axis 38 of the spool 36. Preferably, the spool 36 and the cylindrical member 14 can be rotated together about the central axis 18 of the rotatable member 14.

The metal sheet 10 is placed on the substrate 12 with a first surface 50 of the sheet 10 contacting a first surface 52 of the substrate 12 to form an interface. The metal sheet 10 includes a second surface 56 opposite the first surface 50 wherein the second surface 56 remains exposed when the sheet 10 is placed on the substrate 12. Preferably, the sheet is from about 0.3 millimeters thick to about 8 millimeters thick at the location of attachment to a substrate. Preferably, the substrate 12 is about 4 millimeters thick to about 25 millimeters thick or more at the location of attachment.

The apparatus 16 preferably includes a suitable rotational actuating device, such as a rotary power tool (not shown) capable of directly or indirectly rotating the rotatable member 14, the wire supply 32 or both about the central axis 18. The speed of rotation of the member 14, the wire supply 32 or both about the axis 18 are suitably controlled to help prevent any potential binding of the wire 34 as it is uncoiled from the spool. As will be appreciated, the offset nature of the passage 26 and the windings of wire on the spool 36 may result in relative repositioning of the longitudinal axis of the wire 34 throughout rotation of the rotatable member 14 and the uncoiling of the advancing wire 34.

For attaching the sheet 10 to the substrate 12, the member 14 and wire supply 32 are rotated. During rotation, the circular surface 24 of the leading portion 22 of the member 14 is contacted with the exposed surface 56 of the sheet 10. A suitable pressure is applied for driving the member 34 into and through the sheet 10 and then into the substrate 12. As the member 14 is driven through the sheet 10 and into the substrate 12, the rotation of the member 14 causes the member 14 to frictionally engage the sheet 10 and the substrate 12, the resulting heat from which at least locally heats and melts portions of the sheet 10 and substrate 12 to form a first flowable material 70 is about the rotatable member 14, enabling displacement thereof by the advancing rotatable member 14.

Thereafter, the rotatable member 14 is removed from within the substrate 12 and the sheet 10. Before, during or after the member 14 is removed, the motor 40 rotates the spool 36 thereby unwinding the wire 34 and feeding the wire 34 through the through-hole 26. As the wire 34 is fed through the passage 26, the wire 34 progressively exits the opening 28 at the circular surface 24 into the substrate 12 and sheet 10. During exit, the temperature of the exiting wire 34 is elevated to at least partially melt the exiting wire 34 to form a second flowable material 78. For instance, the temperature of the exiting wire 34 may elevated by heat from friction and heat from portions of the first and second flowable material 70, 78. An external application of heat energy may also be employed.

The wire 34 is preferably fed through the through-hole 26 at a rate sufficient to form the second flowable material 78 and first flowable material 70 as a substantially continuous mass.

Advantageously, the first flowable material 70 and the second flowable material 78 intermix and, upon solidification, solidify to form a substantially solid slug of filler metal that metallurgically bonds with the sheet 10 and the substrate 12 thereby forming a joint between the sheet 10 and the substrate 12. For enhancing bonding, the wire 34 is formed of a material that is metallurgically compatible and capable of metallurgical bonding with the sheet 10 and the substrate 12. Preferred materials for the wire 34 include metal alloys wherein the primary constituent of the metal alloy is soluble in or is the same as the primary metal that forms the sheet 10, the substrate 12 or both. For example, an aluminum-based alloy wire 34 is preferred for attaching a sheet and substrate that are formed of primarily or entirely of aluminum.

As can be seen, the member 14 may be driven into the substrate 12 without necessarily being driven through the substrate 12. It will be appreciated that the present invention provides a method that is particularly useful for attaching a relatively thin metal sheet to a relatively thick substrate where it is either undesirable or unfeasible to form a through-hole in the substrate.

Although the present invention has primarily been discussed as a method and apparatus for attaching a sheet to a substrate, it is contemplated that substantially similar techniques may be used to repair holes or cavities in metal sheets or substrates. Accordingly, the member 14 of the apparatus 16 may be driven into a portion of a metal substrate having a cavity or hole. The rotatable member 14 is withdrawn from the sheet and substrate as the wire 34 is fed out of the member 14 to form a slug.

As can be appreciated, the present invention finds utility in a number of different applications. For example, the metal members (though illustrated as a sheet joined to a substrate) could be any suitable combination of metal parts. Thus, sheet metal, flanges, brackets, trim or the like may be joined to another metal article (e.g., vehicle frame member, vehicle rail member, cast articles, forged articles, or the like).

It should be understood that the invention is not limited to the exact embodiment or construction that has been illustrated and described but that various changes may be made without departing from the spirit and the scope of the invention.

What is claimed is:

1. A method of attaching metal members for forming an automotive vehicle structure, comprising the steps of:
    (a) providing a first metal member;
    (b) contacting the first metal member with a second metal member;
    (c) providing a substantially cylindrical rotatable member with a central axis and an axially extending passage, wherein the rotatable member is formed of a material with a melting point and hardness higher than that of the first and second metal members;
    (d) rotating the rotatable member while frictionally engaging it with the first metal member for locally heating and melting a portion of the first metal member;
    (e) penetrating the rotatable member through the first metal member;
    (f) rotating the rotatable member while frictionally engaging it with the second metal member for locally heating and melting a portion of the second metal member;
    (g) feeding a wire through the axially extending passage;
    (h) melting the wire as it exits the axially extending passage;
    (i) mixing the resulting molten wire with the resulting molten metal of the first and second member; and
    (j) solidifying the resulting mixture to form a joint.

2. A method as in claim 1 wherein the rotatable member includes a leading circular surface.

3. A method as in claim 1 wherein the rotatable member is formed of a refractory metal.

4. A method as in claim 1 wherein the first and second metal members are at least partially formed of aluminum.

5. A method as in claim 1 wherein the rotatable member is made of titanium.

6. A method as in claim 1 wherein the rotatable member is made of high carbon steel.

7. A method as in claim 1 wherein the wire is formed of a material that is metallurgically compatible with the first and second members.

8. A method as in claim 1 wherein the first metal member is a metal sheet and the second metal member is a metal casting.

9. A method of attaching metal members for forming an automotive vehicle structure, comprising the steps of:
    (a) providing a metal sheet;
    (b) contacting the metal sheet with a metal substrate;
    (c) providing a substantially cylindrical rotatable member with a central axis and an axially extending passage offset relative to the central axis, wherein the member is formed of a material with a melting point and hardness higher than that of the first and second metals and is selected from titanium or high carbon steel;
    (d) rotating the rotatable member while frictionally engaging it with the metal sheet for locally heating and melting a portion of the metal sheet;
    (d) penetrating the rotatable member through the metal sheet;
    (f) rotating the rotatable member while frictionally engaging it with the metal substrate for locally heating and melting a portion of the metal substrate;
    (g) feeding a wire through the axially extending passage;
    (h) melting the wire as it exits the axially extending passage;

(i) mixing the resulting molten wire with the resulting molten metal of the sheet and substrate; and (j) solidifying the resulting mixture to form a slug of material metallurgically bonded to the sheet and substrate.

10. A method as in claim 9 wherein the sheet and substrate are aluminum.

11. A method according to claim 9 wherein the substrate is a metal casting.

12. A method according to claim 9, wherein the feeding step(g) includes providing the wire coiled on a spool.

13. A method according to claim 12, wherein the feeding step(g) includes providing an aluminum wire coiled on a spool.

14. A method according to claim 9, wherein the feeding step(g) occurs while the rotatable member is being withdrawn from the sheet and substrate.

15. A method of attaching metal members for forming an automotive vehicle structure, comprising the steps of:

(a) providing a sheet of aluminum-based metal adapted for incorporation into an automotive vehicle;

(b) contacting the sheet of aluminum with an aluminum-based casting, the casting also being adapted for incorporation into the automotive vehicle;

(c) providing a substantially cylindrical rotatable member with a central axis and an axially extending passage offset relative to the central axis, wherein the member is formed of a material selected from titanium or high carbon steel;

(d) rotating the rotatable member while frictionally engaging it with the sheet for locally heating and melting a portion of the sheet;

(d) penetrating the rotatable member through the first metal sheet;

(f) rotating the rotatable member while frictionally engaging it with the casting for locally heating and melting a portion of the casting;

(g) feeding an aluminum-based wire through the axially extending passage while the rotatable member is being withdrawn from the sheet and the casting;

(h) melting the wire as it exits the axially extending passage;

(i) mixing the resulting molten wire with the resulting molten metal of the sheet and casting; and (j) solidifying the resulting mixture to form a slug of material metallurgically bonded to the sheet and casting.

* * * * *